(12) United States Patent
Kuroda et al.

(10) Patent No.: US 8,269,988 B2
(45) Date of Patent: Sep. 18, 2012

(54) PRINT TERMINAL, PRINT SYSTEM, STORAGE MEDIUM, AND PROGRAM

(75) Inventors: Tatsuya Kuroda, Kanagawa (JP); Kohei Sakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 10/823,940

(22) Filed: Apr. 14, 2004

(65) Prior Publication Data

US 2004/0252318 A1 Dec. 16, 2004

(30) Foreign Application Priority Data

Apr. 15, 2003 (JP) ................. P2003-109779

(51) Int. Cl.
*B41J 17/30* (2006.01)
*G09G 5/00* (2006.01)
*G06K 9/32* (2006.01)
*G06K 9/40* (2006.01)
*G06K 15/00* (2006.01)
*H04N 1/40* (2006.01)

(52) U.S. Cl. ...... 358/1.12; 358/1.14; 358/448; 347/212; 345/658; 382/297; 382/274

(58) Field of Classification Search ............... 358/1.16, 358/297, 448, 452, 498, 487, 1.14; 382/297, 382/274, 317; 345/658, 648, 629; 347/212
See application file for complete search history.

(56) References Cited

U.S. PATENT DOCUMENTS

| | | | | |
|---|---|---|---|---|
| 5,072,245 A | * | 12/1991 | Tamura et al. | 347/212 |
| 5,301,036 A | * | 4/1994 | Barrett et al. | 358/448 |
| 5,461,459 A | * | 10/1995 | Muramatsu et al. | 358/448 |
| 5,508,810 A | * | 4/1996 | Sato | 358/296 |
| 6,262,814 B1 | * | 7/2001 | Furukawa | 358/487 |
| 6,281,872 B1 | * | 8/2001 | Cariffe | 345/658 |
| 6,400,851 B1 | * | 6/2002 | Shih | 382/297 |
| 6,466,231 B1 | * | 10/2002 | Dow et al. | 345/629 |
| 6,470,098 B2 | * | 10/2002 | Yamaguchi et al. | 358/1.16 |
| 6,493,472 B1 | * | 12/2002 | Takagi et al. | 382/298 |
| 2002/0105669 A1 | * | 8/2002 | Watanabe et al. | 358/1.14 |
| 2002/0106134 A1 | * | 8/2002 | Dundon et al. | 382/274 |
| 2004/0165232 A1 | * | 8/2004 | Chiba et al. | 358/498 |

FOREIGN PATENT DOCUMENTS

JP 11-341272 A 12/1999

(Continued)

OTHER PUBLICATIONS

Japanese Office Action Issued on Sep. 18, 2007.
Japanese Patent Office, Office Action issued in Japanese Patent Application 2008-020307, on Aug. 25, 2009.

(Continued)

*Primary Examiner* — Akwasi M Sarpong
(74) *Attorney, Agent, or Firm* — SNR Denton US LLP

(57) ABSTRACT

A print terminal includes a memory reader for reading image data recorded in a recording medium, an image-capturing unit for capturing the image data read by the memory reader, and an image-processing unit for processing the image data captured by the image-capturing unit. The image-processing unit has a first rotation-processing function for rotating a print image to be used in printing the image data, a second rotation-processing function for rotating a print-medium image to change the orientation of a print medium to be used in printing the image data, and a third rotation function for simultaneously rotating both the print image and the print-medium image.

7 Claims, 6 Drawing Sheets

FOREIGN PATENT DOCUMENTS

| | | |
|---|---|---|
| JP | 2000-151977 A | 5/2000 |
| JP | 2000-261649 A | 9/2000 |
| JP | 2001-36364 | 5/2001 |
| JP | 2002-006418 | 1/2002 |
| JP | 2002-006418 A | 1/2002 |
| JP | 2002-094842 | 3/2002 |
| JP | 2003037798 | 2/2003 |

OTHER PUBLICATIONS

English translation of JP 2002-006418.
Japanese Office Action issued on Mar. 8, 2011 in connection with counterpart JP Application No. 2008-020307.
European Patent Office Communication pursuant to Article 94(3) EPC dated Mar. 10, 2011.

* cited by examiner

PRINT TERMINAL, PRINT SYSTEM, STORAGE MEDIUM, AND PROGRAM

RELATED APPLICATION DATA

The present application claims priority to Japanese Application(s) No(s). P2003-109779 filed Apr. 15, 2003, which application(s) is/are incorporated herein by reference to the extent permitted by law.

BACKGROUND OF THE INVENTION

1. Field of the Invention

The present invention relates to print terminals, print systems, storage media, and programs for printing image data.

2. Description of the Related Art

Generally, images obtained by, for example, digital still cameras and those read by scanners are rectangular in shape. For printing the images on sheet-like print media such as print paper by print apparatuses such as printers, the orientations of images to be actually printed (hereinafter referred to as "print images") and the orientations (feeding directions) of the print media are often adjusted to coincide with each other. Therefore, some known apparatuses are provided with functions for changing the orientations of print images and print media in applications (such as printer drivers) running on the displays of personal computers and printers.

For example, Japanese Unexamined Patent Application Publication No. 2003-37798 discloses a print apparatus provided with an image rotation button and a paper shift/rotation button. In addition, Japanese Unexamined Patent Application Publication No. 2000-78394 discloses an apparatus with an image rotation button, while Japanese Unexamined Patent Application Publication No. 11-341272 discloses an image processing method including a step of image rotation.

Subject images obtained by, for example, a digital still camera are in vertical or horizontal orientation depending on the position of the camera at the time of shooting (when the shutter is pressed). For example, shooting of a head-to-toe picture of a standing person by using a camera in a horizontal position produces, as shown in FIG. 6A, a horizontally-oriented rectangular image in which the person's head and toes are positioned at the top and bottom, respectively (hereinafter referred to as a "first image"). On the other hand, the camera in a vertical position produces, as shown in FIG. 6B, a horizontally-oriented rectangular image in which the person's head and toes are positioned on the left and right, respectively (hereinafter referred to as a "second image"), or conversely, the head and toes are positioned on the right and left, respectively.

Here, a horizontally-oriented rectangular image, whose horizontal sides are longer than its vertical sides, is defined as a landscape image, while a vertically-oriented rectangular image, whose vertical sides are longer than its horizontal sides, is defined as a portrait image. In this case, the first image and the second image shown in FIG. 6A and FIG. 6B, respectively, can be changed from landscape images to portrait images by 90-degree rotation of the images. Images obtained by, for example, a digital still camera are normally landscape images. Subject images are stored, as shown in FIGS. 6A and 6B, depending on the position of the camera at the time of shooting. In printer settings of an application such as a printer driver, the orientation of a sheet serving as a print medium can be changed from portrait to landscape or from landscape to portrait.

Therefore, when a print image is in landscape orientation and a print medium is in portrait orientation, the orientation of the print image is changed to portrait with reference to the orientation of the print medium, or the orientation of the print medium is changed to landscape with reference to the orientation of the print image, thereby matching the orientations of both the print image and the print medium.

When a print medium is initially in landscape orientation in printer settings of an application such as a printer driver, and if a printer accommodates only a print medium in portrait orientation, the orientation of the print medium needs to be changed to portrait in the printer settings. In this case, when an image obtained by shooting with a digital still camera in vertical position (for example, FIG. 6B) is to be printed, the orientation of the image needs to be changed, in accordance with the print medium, from landscape to portrait. Since, in known techniques, this involves individual rotation of the print-medium image and the print image, the user operation is complicated.

SUMMARY OF THE INVENTION

The present invention is made to solve the problem described above. An object of the present invention to simplify the user operation in printing image data obtained by shooting with, for example, a digital still camera.

A print terminal of the present invention includes an image-capturing unit for capturing image data, a first rotation-processing unit for rotating a print image to be used in printing the image data captured by the image-capturing unit, a second rotation-processing unit for rotating a print-medium image to change the orientation of a print medium to be used in printing the image data captured by the image-capturing unit, and a third rotation-processing unit for simultaneously rotating both the print image and the print-medium image.

To print the image data captured by the image-capturing unit, in this print terminal, the first rotation-processing unit rotates the print image, the second rotation-processing unit rotates the print-medium image, and the third rotation-processing unit simultaneously rotates both the print image and the print-medium image.

DESCRIPTION OF THE PREFERRED EMBODIMENT

An embodiment of the present invention will now be described in detail with reference to the drawings.

Figure 1:
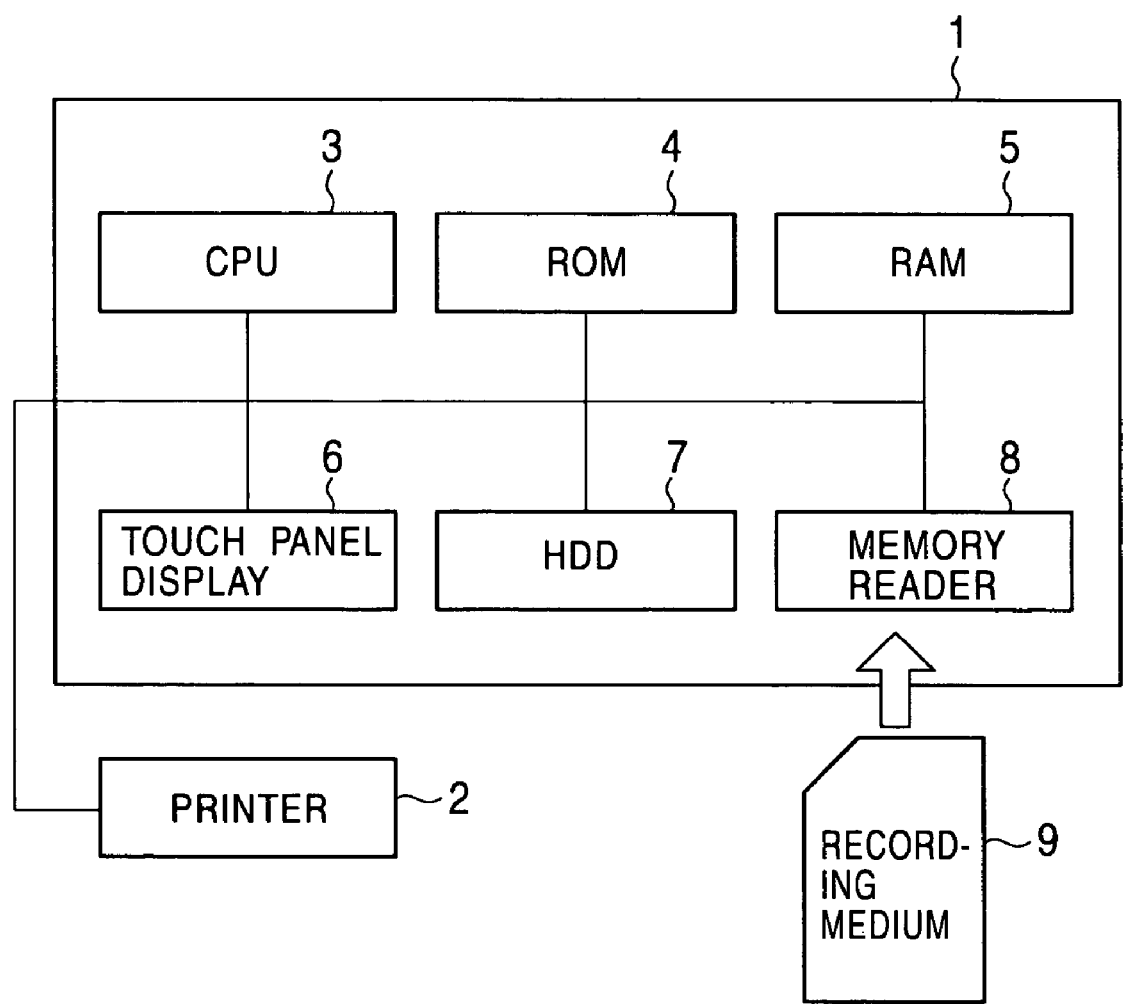
FIG. 1 is a block diagram of a print system according to an embodiment of the present invention.

FIG. 1 is a block diagram of a print system according to the embodiment of the present invention. The print system is composed mainly of a print terminal 1 and a printer 2. The print terminal 1 and the printer 2 are connected via communication tools such as a printer cable and a wireless local area network (LAN). Examples of the printer 2 include a color laser printer.

The print terminal 1 is an integrated combination of a central processing unit (CPU) 3, a read-only memory (ROM) 4, a random-access memory (RAM) 5, a touch panel display 6, a hard disk drive (HDD) 7, and a memory reader 8. Although the display 6 and the memory reader 8 may be provided as external units, integrating them in the print terminal 1 is preferable for making the entire print system compact.

The CPU 3 controls the overall operation in the print terminal 1, according to operation programs stored (installed) in the HDD 7. A basic input/output system (BIOS) is written in the ROM 4. The BIOS is provided for the CPU 3 to control peripheral devices, such as the printer 2, the display 6, the HDD 7, and the memory reader 8, in executing the operation programs.

The RAM 5 is a work area for the CPU 3 in executing the operation programs.

The display 6 displays various types of information to users on the screen, while receiving operational instructions from users via a touch panel. The operational instructions from users may also be received via input devices such as a keyboard, mouse, stick, and buttons. The HDD 7 is a large-capacity memory device for storing the described operation programs, other application programs (for example, a word-processing program and an image-editing program), and various types of data (for example, image data and document data). The memory reader 8 reads image data recorded in the recording medium 9 such as a memory card, a floppy (registered trademark) disk, and a CD-ROM. Users of the print terminal 1 can receive print services simply by placing the portable (compact) recording medium 9 in the memory reader 8.

Users use the above-described various types of recording medium in, for example, personal computers and digital still cameras. Therefore, the memory reader 8 is preferably capable of reading image data stored in the various types of recording medium. In this case, the memory reader 8 is provided with a plurality of slots corresponding to the types of recording medium and a reader for reading image data from the recording medium in the slot.

Figure 2:
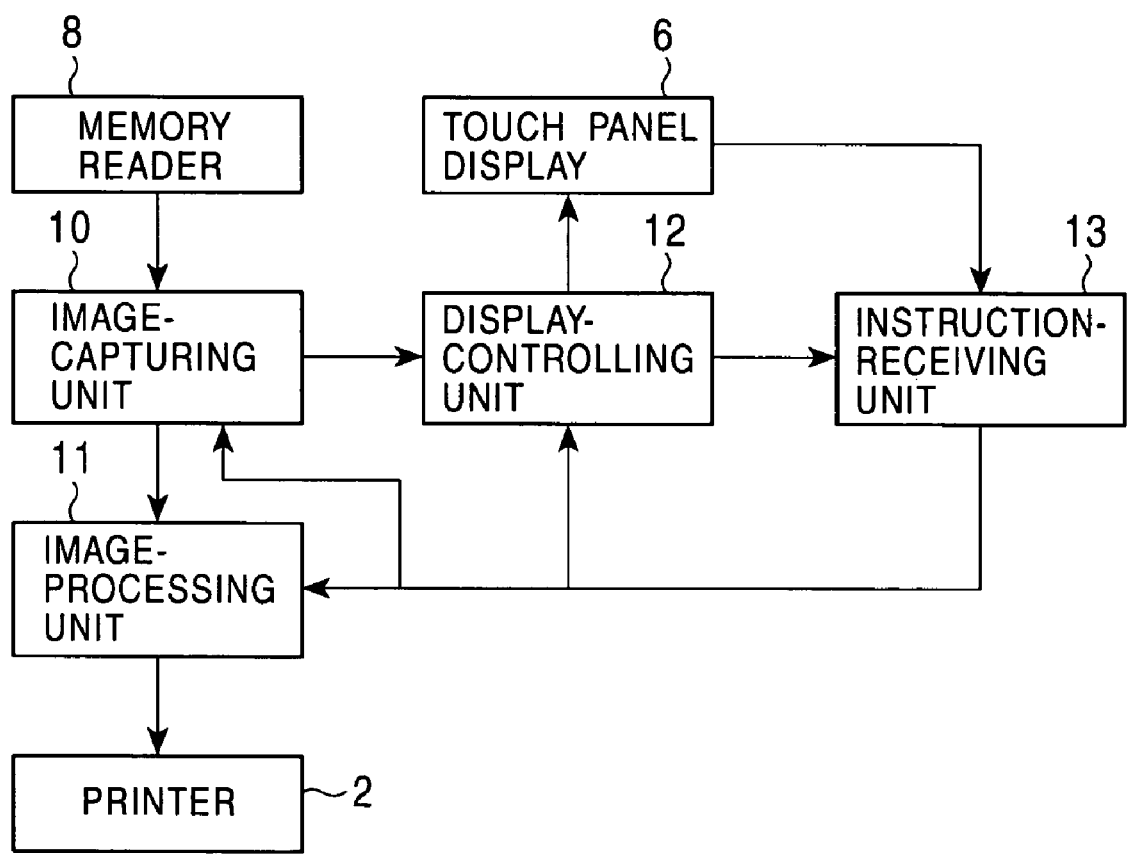
FIG. 2 is a block diagram of a print terminal.

FIG. 2 is a block diagram showing the structure of the print terminal 1, which includes functional units implemented by the CPU 3 executing the above-described operation programs. In FIG. 2, an image-capturing unit 10 captures image data read by the memory reader 8. In addition, the image-capturing unit 10 may capture image data transmitted from, for example, external devices via a communication interface.

An image-processing unit 11 performs predetermined image processing on the image data captured by the image-capturing unit 10. Processes performed by the image-processing unit 11 include a conversion process, a first rotation process, a second rotation process, and a third rotation process. In the conversion process, the image-processing unit 11 converts the image data captured by the image-capturing unit 10 to print data (for example, data described in page-description language, that is, PDL data). In the first rotation process, the image-processing unit 11 rotates the print image to be used in printing the image data captured by the image-capturing unit 10. In the second rotation process, the image-processing unit 11 rotates the print-medium image to change the orientation of a print medium to be used in printing the image data captured by the image-capturing unit 10. In the third rotation process, both the print image and the print-medium image are simultaneously rotated.

A display-controlling unit 12 controls display in the display 6. The display-controlling unit 12 allows the display 6 to display the image data captured by the image-capturing unit 10 as a visible image, a prepared processing menu (incorporated in the operation program), operation buttons, and the image data processed by the image-processing unit 11. The operation buttons are provided for users to input operational instructions via a touch panel of the display 6. An instruction-receiving unit 13 receives the operational instructions input by the users using the operation buttons, and transmits the received instructions to the image-capturing unit 10, the image-processing unit 11, and the display-controlling unit 12.

Figure 3:
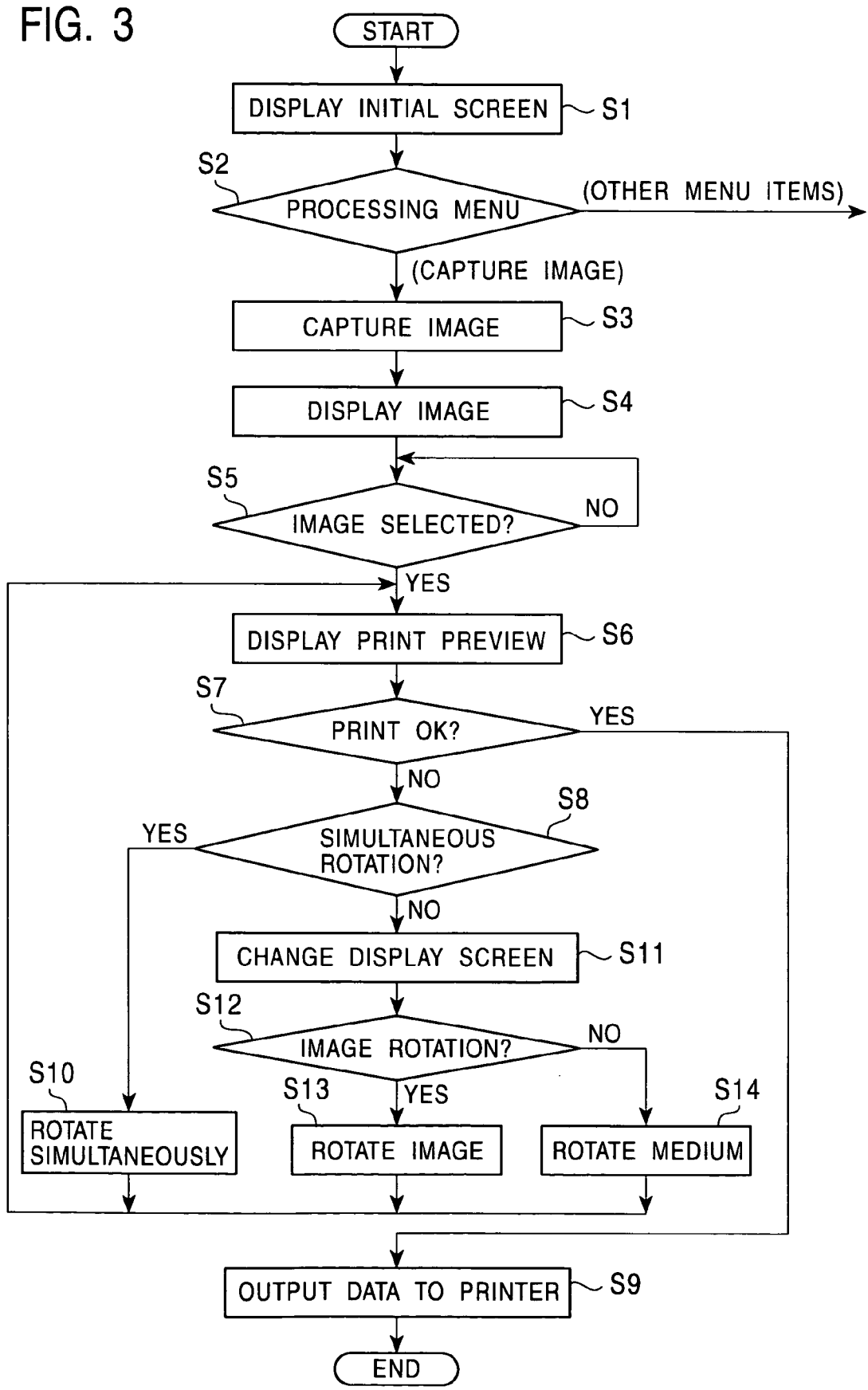
FIG. 3 is a flowchart showing an example of processing in the print terminal.

FIG. 3 is a flowchart showing an example of processing in the print terminal 1, the processing being implemented by the CPU 3 executing the operation program. First, an initial screen appears on the display 6 according to the instruction from the display-controlling unit 12 (step S1). The initial screen shows, for example, a message for operator guidance and a processing menu.

Next, a user selects a desired menu item from the processing menu. Then the instruction-receiving unit 13 confirms the selected item (step S2). When the confirmed menu item is "Capture Image," the instruction is sent to the image-capturing unit 10 for enabling it to capture image data (step S3). Here, the image-capturing unit 10 captures the image data read by the memory reader 8. When data of a plurality of images is stored in the recording medium 9, which is placed in the memory reader 8, the data is sequentially read by the memory reader 8 to be captured by the image-capturing unit 10. When a processing menu item other than "Capture Image" is confirmed in the instruction-receiving unit 13, the remaining processing proceeds according to the confirmed menu item (the details are omitted here).

Subsequently, the image data captured by the image-capturing unit 10, as described above, is sent to the display-controlling unit 12 to be displayed on the display 6 (step S4). When data of a plurality of images is captured by the image-capturing unit 10, the data is listed on the display 6.

Then the instruction-receiving unit 13 confirms whether the user selects a print image from the image data listed on the display 6 (step S5). When the user selects a print image by actually pressing a selection button on the display 6, a print preview window is displayed on the display 6 according to a display instruction from the display-controlling unit 12 (step S6). In this preview window, a print-medium image and the print image are displayed in different layers. For example, a rectangular print image selected by the user is superimposed on a rectangular frame representing the outline of a sheet serving as a print medium.

Figure 4A:
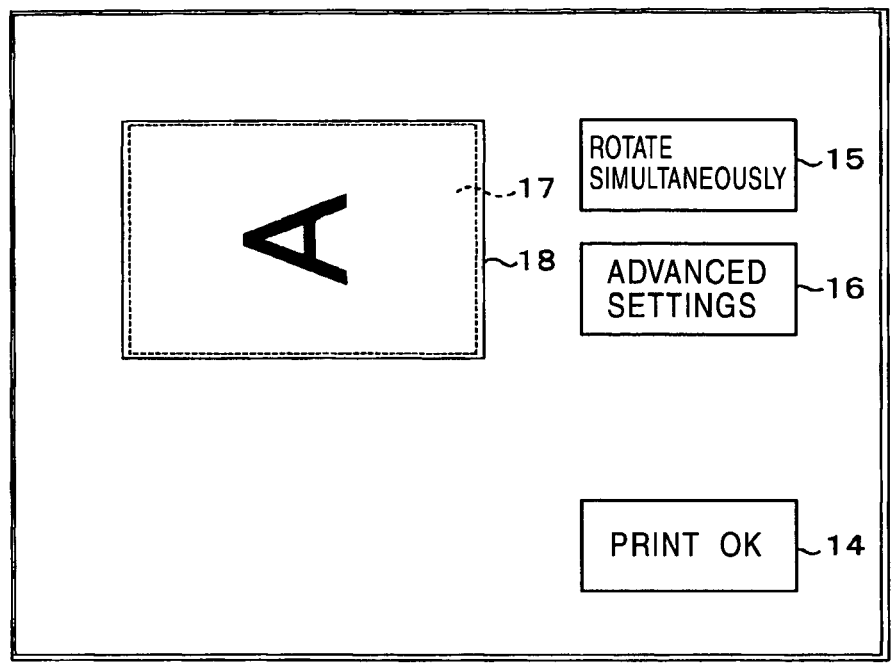
FIGS. 4A and 4B show examples of print previews before rotation processing.

Operation buttons as well as the preview window are displayed on the display 6. The instruction-receiving unit 13 confirms the operation button pressed by the user (steps S7 and S8). As shown in FIG. 4A, the displayed operation buttons include a "Print OK" button 14 for printing the print image, a "Rotate Simultaneously" button 15 for simultaneously rotating both the print image and the print-medium image (third rotation process), and an "Advanced Settings" button 16 for switching to an advanced settings screen provided for individually rotating the print image and the print-medium image. These operation buttons ("Print OK" button 14, "Rotate Simultaneously" button 15, and "Advanced Settings" button 16) are displayed together with the preview window in which a print image 17 (the image including the letter "A" in the drawing) and a print-medium image 18 are displayed in layers.

In the preview window described above, the entire print image 17 may be displayed at a size smaller than the size of the print-medium image 18. Alternatively, the print image 17 may be enlarged or reduced to substantially the same size as the print-medium image 18.

When the user presses the "Print OK" button 14, the corresponding processing instruction is sent from the instruction-receiving unit 13 to the image-processing unit 11. While maintaining the orientation of the print image 17 displayed on the display 6 at this point, the image-processing unit 11 converts the image data to be printed to the print data and feeds the print data to the printer 2 (step S9). Thus, the image data (print data) from the image-processing unit 11 is transferred from the print terminal 1, via the described communication tools, to the printer 2 and is printed on sheets.

When the user presses the "Rotate Simultaneously" button 15, the corresponding process instruction is sent from the instruction-receiving unit 13 to the image-processing unit 11. Then, the image-processing unit 11 proceeds to the third rotation process in which the print image and print-medium image displayed on the display 6 at this point are simultaneously rotated (step S10).

Figure 5:
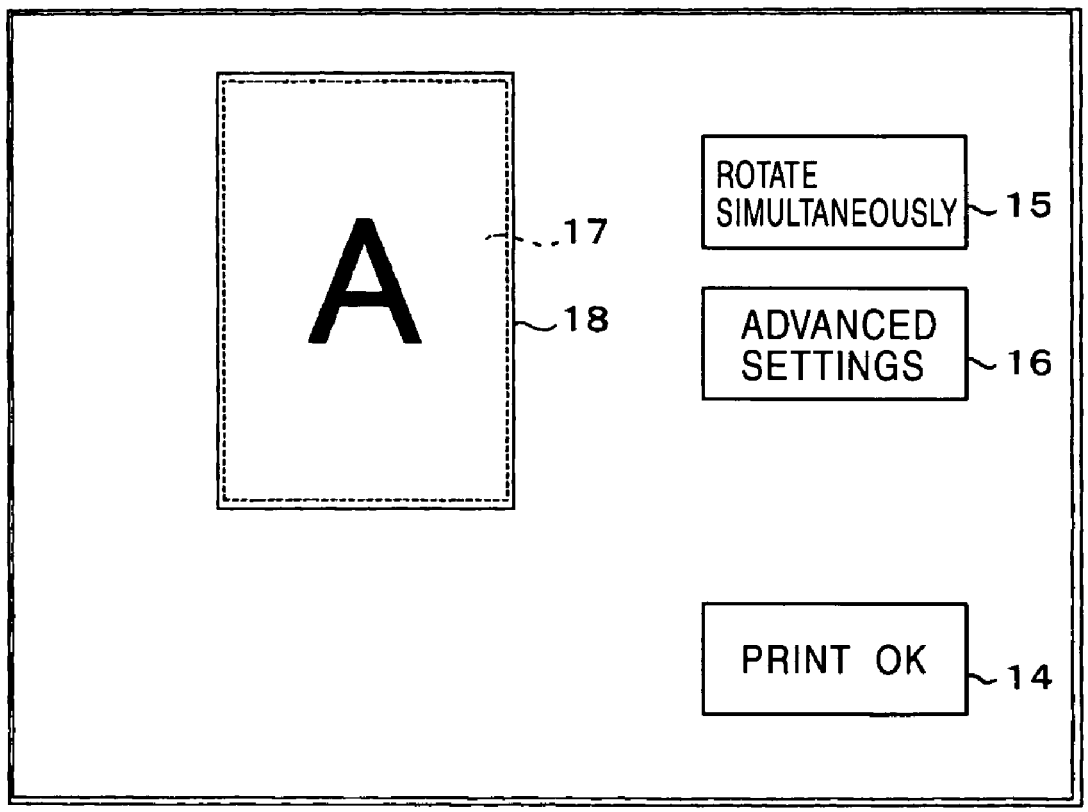
FIG. 5 shows an example of a print preview after rotation processing.
Figure 6A:
FIGS. 6A and 6B show examples of images obtained by shooting with a camera.
Figure 6B:

In the third rotation process, the image-processing unit 11 simultaneously rotates the print image 17 and the print-medium image 18 in the same direction by 90 degrees. Thus, the orientation of the print image 17 is changed from landscape to portrait (or from portrait to landscape), while the orientation of the print-medium image 18 is changed from landscape to portrait (or from portrait to landscape). As shown in FIG. 4A, when both the print image 17 and the print-medium image 18 are in landscape orientation before the rotation process, their orientation is changed to portrait, as shown in FIG. 5, by simultaneous rotation. That is, a change of the orientation from landscape to portrait can be made in one step.

Subsequently, a result of the rotation process in the image-processing unit 11 is displayed again in the preview window of the display 6 according to the display instruction from the display-controlling unit 12 (step S6). When the user presses the "Print OK" button 14 on the display 6, the image data (print data) processed by the image-processing unit 11 is fed to the printer 2 (step S9).

Figure 4B:
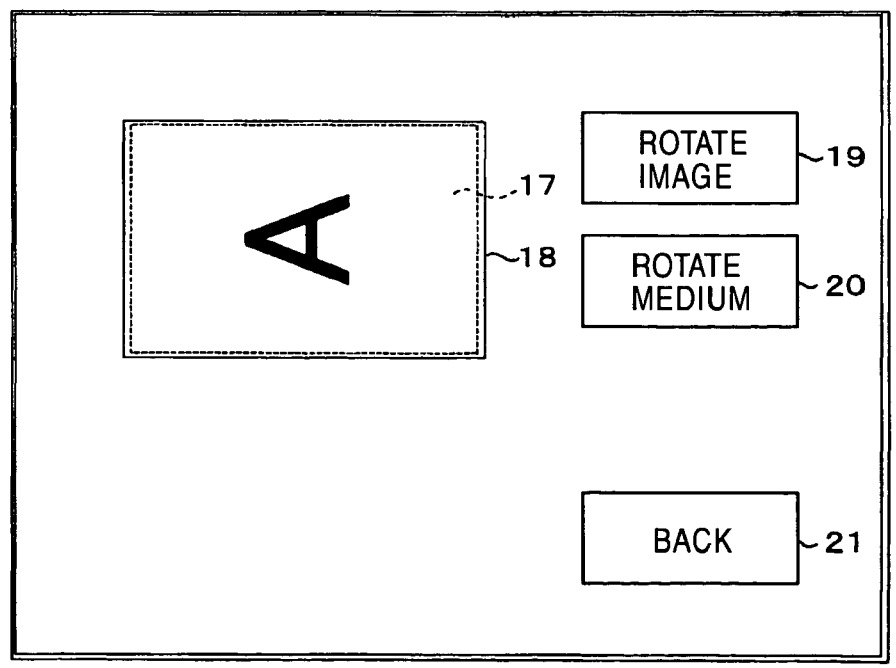

On the other hand, when the user presses the "Advanced Settings" button 16, the display-controlling unit 12 enables the display 6 to display the advanced settings screen according to the instruction from the instruction-receiving unit 13 (step S11). As shown in FIG. 4B, the advanced settings screen includes a preview window in which the print image 17 (the image including the letter "A" in the drawing) and the print-medium image 18 are displayed, a "Rotate Image" button 19 for executing the first rotation process in which the print image 17 is individually (independently) rotated, a "Rotate Medium" button 20 for executing the second rotation process in which the print-medium image 18 (sheet image) is individually (independently) rotated, and a "Back" button 21 for switching to the previous screen shown in FIG. 4A.

When the user presses the "Rotate Image" button 19 ("Yes" in step S12), the corresponding process instruction is sent from the instruction-receiving unit 13 to the image-processing unit 11. While maintaining the orientation of the print-medium image 18, the image-processing unit 11 proceeds to the first rotation process in which the print image 17 is rotated (step S13). Here, the image-processing unit 11 rotates the print image 17 by 90 degrees or less. When the image-processing unit 11 rotates the print image 17 by 90 degrees, the orientation of the print image 17 is changed from landscape to portrait, or from portrait to landscape.

When the image-processing unit 11 rotates the print image 17 by any angle from 1 to 90 degrees, the print image 17 tilts according to the angle. Therefore, the image-processing unit 11 can correct a tilt of an obtained image, such as an image obtained by shooting with a digital camera and a document image read by a scanner, by rotating the print image 17 according to the degree of the tilt. The tilt of the print image 17 from the print-medium image 18, in the preview window, can be properly handled by trimming the print image 17.

On the other hand, when the user presses the "Rotate Medium" button 20 ("No" in step S12), the corresponding process instruction is sent from the instruction-receiving unit 13 to the image-processing unit 11. While maintaining the orientation of the print image 17, the image-processing unit 11 proceeds to the second rotation process in which the print-medium image 18 is rotated (step S14). Here, the image-processing unit 11 rotates the print-medium image 18 by 90 degrees. Thus, the orientation of the print-medium image 18 is changed from landscape to portrait, or from portrait to landscape.

After the rotation of the print image 17 in step S13 or the rotation of the print-medium image 18 in step S14, the results of the rotation processes are displayed again in the preview window of the display 6 according to the display instruction from the display-controlling unit 12 (step S6). When the user presses the "Print OK" button 14 on the display 6, the image data (print data) processed by the image-processing unit 11 is fed to the printer 2 (step S9).

Besides individually rotating print images and print-media images, the image-processing unit 11 simultaneously rotates both print images and print-media images. Thus, the user operation in printing image data obtained by shooting with, for example, a digital still camera can be simplified.

For example, an image data is obtained by shooting with a digital still camera in a vertical position. To print the obtained image data on a print medium after changing the orientation thereof from landscape to portrait, individual rotations of the print image and the print-medium image become unnecessary. Since the image-processing unit 11 rotates both the print image and the print-medium image together, the user operation for rotating them is simplified. The print terminal 1 with excellent usability can thus be provided to users of print services.

The present invention can be provided as a computer-readable storage medium (for example, a floppy (registered trademark) disk and CD-ROM) storing an operation program to be executed by the CPU 3. The program stored in the storage medium implements an image-capturing function for capturing image data, a first rotation-processing function for rotating a print image to be used in printing the image data captured by the image-capturing function, a second rotation-processing function for rotating a print-medium image to change the orientation of a print medium to be used in printing the image data captured by the image-capturing function, and a third rotation-processing function for simultaneously rotating both the print image and the print-medium image.

Additionally, the present invention can also be provided as a program for enabling computers to implement an image-capturing function for capturing image data, a first rotation-processing function for rotating a print image to be used in printing the image data captured by the image-capturing function, a second rotation-processing function for rotating a print-medium image to change the orientation of a print medium to be used in printing the image data captured by the image-capturing function, and a third rotation-processing function for simultaneously rotating both the print image and the print-medium image.

As described above, both the print image and the print-medium image are simultaneously rotated according to the present invention, thereby simplifying the user operation in printing an image data obtained by shooting with, for example, a digital still camera.

What is claimed is:

1. A print terminal comprising:
an image-capturing unit for retrieving captured image data and outputting the captured image data;
a display unit configured to display the captured image data as a print image superimposed on a print-medium image, said print image and said print-medium image are displayed as different layers in which said print image comprises a rectangular shape with the captured image data being displayed with an outermost boundary that defines the rectangular shape, and said print-medium image comprises a frame that is displayed to represent an outline of a sheet serving as a print medium, the boundary being distinct from the frame; and
an image-processing unit configured to (i) independently rotate the print-medium image by a first rotation angle, (ii) independently rotate the print image by a second rotation angle, and (iii) simultaneously rotate both the print image and the print-medium image in a common direction by a common rotation angle,
wherein,
said second rotation angle is selectable within a range of one to ninety degrees, and
said image-processing unit is configured to rotate, in response to input, an orientation of the print medium image relative to the print image.

2. The print terminal according to claim 1, wherein rotating the captured image data by a rotation angle less than ninety degrees corrects a tilt of the captured image data.

3. The print terminal according to claim 1, further comprising a reader for reading the image data from a recording medium, wherein the image-capturing unit receives image data read by the reader.

4. The print terminal of claim 1, wherein the display unit displays a result of the rotation process performed by the image processing unit.

5. The print terminal of claim 1, wherein the common rotation angle is 90°.

6. A print system comprising:
a print terminal comprising:
an image-capturing unit for retrieving captured image data and outputting the captured image data;
a display unit configured to display the captured image data as a print image superimposed on a print-medium image, said print image and said print-medium image are displayed as different layers in which said print image comprises a rectangular shape with the captured image data displayed with an outermost boundary that defines the rectangular shape, and said print-medium image comprises a frame that is displayed to represent an outline of a sheet serving as a print medium, the boundary being distinct from the frame;
an image-processing unit configured to (i) independently rotate the print-medium image by a first rotation angle, (ii) rotate the print image by a second rotation angle, and (iii) simultaneously rotate both the print image and the print-medium image in a common direction by a common rotation angle, and
a printer for printing the print image on the print medium;
wherein,
said second rotation angle is selectable within a range of one to ninety degrees, and
said image-processing unit rotates, in response to input, an orientation of the print medium image relative to the print image.

7. A non-transitory computer-readable storage medium having a computer program stored thereon, the computer program, when executed, causes a processor to perform a method comprising the steps of:
displaying a print-medium image and a print image on a display unit, whereby said print image is displayed superimposed on the print-medium image, said print image and said print-medium image are displayed as different layers in which said print image comprises a rectangular shape with the captured image data displayed with an outermost boundary that defines the rectangular shape, and said print medium image comprises a frame that is displayed to represent an outline of a sheet serving as a print medium, the boundary being distinct from the frame;
controlling, with an image-processing unit, an orientation of the print medium relative to the print image, said image-processing unit being configured to (i) independently rotate the print-medium image by a first rotation angle, (ii) independently rotate the print image by a second rotation angle, and (iii) simultaneously rotate both the print image and the print-medium image by a common rotation angle; and
displaying on the display unit a print preview of said print-medium image and the print image resulting from said controlling step,
wherein,
said second rotation angle is selectable within a range of one to ninety degrees, and
said image-processing unit is configured to rotate, in response to input, said orientation of the print medium relative to the print image.

* * * * *